(12) United States Patent
Schumann et al.

(10) Patent No.: US 11,801,986 B2
(45) Date of Patent: Oct. 31, 2023

(54) DEVICE AND METHOD FOR PRODUCING

(71) Applicant: LTS Lohmann Therapie—Systeme AG, Andernach (DE)

(72) Inventors: Klaus Schumann, Neuwied (DE); Rolf Böhm, Kleinmaischeid (DE); Torsten Grunenberg, Nickenich (DE); Bernd Grünes, Bonn (DE); Markus Bee, Kettig (DE); Anna Schlüter, Bonn (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 366 days.

(21) Appl. No.: 16/633,995

(22) PCT Filed: Jul. 21, 2018

(86) PCT No.: PCT/DE2018/000222
§ 371 (c)(1),
(2) Date: Jan. 24, 2020

(87) PCT Pub. No.: WO2019/020139
PCT Pub. Date: Jan. 31, 2019

(65) Prior Publication Data
US 2021/0009329 A1    Jan. 14, 2021

(30) Foreign Application Priority Data

Jul. 26, 2017   (DE) .................... 10 2017 006 991.3

(51) Int. Cl.
*B65D 75/30* (2006.01)
*B29C 65/00* (2006.01)
*B29L 31/00* (2006.01)

(52) U.S. Cl.
CPC .......... *B65D 75/30* (2013.01); *B29C 66/1122* (2013.01); *B29C 66/849* (2013.01); *B29L 2031/7128* (2013.01)

(58) Field of Classification Search
CPC .... B65D 75/30; B29C 66/1122; B29C 66/849
See application file for complete search history.

(56) References Cited

U.S. PATENT DOCUMENTS

| | | | | | |
|---|---|---|---|---|---|
| 4,557,381 A | * | 12/1985 | Whitney | ................ | B65D 75/38 |
| | | | | | 206/812 |
| 4,881,359 A | * | 11/1989 | Schirmer | ............... | B65D 75/38 |
| | | | | | 426/396 |

(Continued)

FOREIGN PATENT DOCUMENTS

| CN | 1242752 A | 1/2000 |
|---|---|---|
| CN | 1336893 A | 2/2002 |

(Continued)

OTHER PUBLICATIONS

Document provided by third party in opposition alleging evidence of proof of purchase of Novartis patches with lot No. 454320, alleging a delivery date of May 5, 2014.

(Continued)

*Primary Examiner* — Daniel McNally
(74) *Attorney, Agent, or Firm* — THE WEBB LAW FIRM (57) ABSTRACT

Provided is a method for producing a sealed-edge pouch with a laminate composite stored therein. In some non-limiting embodiments or aspects the laminate composite is detached from a laminate composite web having a carrier film with substrates which are arranged thereon and are covered by means of a respective cover film. An intermediate body is supplied to the laminate composite web or to the laminate composite or is moulded into the carrier film such that the intermediate body or the intermediate bodies (Continued)

surrounds/surround all of the free surfaces of the substrate at least in regions. The laminate composite and all of the intermediate bodies are introduced between two packaging material webs. The packaging material webs are sealed to each other. Finally, the sealed-edge pouches are separated. A device for producing sealed-edge pouches and a sealed-edge pouch produced according to this method are also provided.

6 Claims, 6 Drawing Sheets

(56) References Cited

U.S. PATENT DOCUMENTS

| | | | |
|---|---|---|---|
| 4,991,378 A | | 2/1991 | Dotta |
| 5,115,913 A | * | 5/1992 | Anhauser ............... B65D 75/54 |
| | | | 206/440 |
| 6,440,513 B1 | | 8/2002 | Kibele et al. |
| 6,467,621 B1 | * | 10/2002 | Ishida .................... A61K 9/703 |
| | | | 206/460 |
| 6,571,983 B1 | * | 6/2003 | Schumann ................ B26F 1/22 |
| | | | 221/25 |
| 6,622,865 B1 | * | 9/2003 | Theobald ............... A61F 15/001 |
| | | | 206/460 |
| 6,737,080 B1 | | 5/2004 | Schumann |
| 6,841,716 B1 | | 1/2005 | Tsutsumi |
| 2004/0168945 A1 | | 9/2004 | Houze |
| 2006/0000734 A1 | | 1/2006 | Ninomiya et al. |

FOREIGN PATENT DOCUMENTS

| | | |
|---|---|---|
| DE | 1936607 | 2/1971 |
| DE | 3921434 A1 | 1/1991 |
| DE | 3874302 T2 | 12/1992 |
| DE | 19650329 A1 | 6/1998 |
| DE | 19830898 A1 | 1/2000 |
| DE | 19902196 C1 | 6/2000 |
| DE | 19925613 A1 | 12/2000 |
| DE | 69811054 T2 | 8/2003 |
| DE | 60006380 T2 | 5/2004 |
| EP | 0635262 A2 | 1/1995 |
| EP | 2340815 A1 | 7/2011 |
| EP | 2611430 B1 | 3/2014 |
| JP | H0343372 A | 2/1991 |
| JP | 2000271164 A | 10/2000 |
| JP | 2007099313 A | 4/2007 |
| JP | 2008500242 A | 1/2008 |
| KR | 101554328 B1 | 10/2015 |
| WO | 9923012 A1 | 5/1999 |
| WO | 2005115843 A1 | 12/2005 |

OTHER PUBLICATIONS

Ghosh et al., "Transdermal and Topical Drug Delivery Systems," 1997, pp. 284, 285, and 288, Interpharm Press Inc., Buffalo Grove, IL.

Harro Höfliger Verpackungsmaschinen GmbH, Beutelverpackung, Apr. 25, 2017, https://web.archive.org/web/20170531124637/http://www.hoefliger.com/nc/maschinen/beutelverpackung/.

Harro Höfliger Verpackungsmaschinen GmbH, Bahnverarbeitungsmaschinen, May 31, 2017, https://web.archive.org/web/20170531124424/http://www.hoefliger.com:80/maschinen/bahnverarbeitungsmaschinen/?no_cache=1&kat=94.

* cited by examiner

DEVICE AND METHOD FOR PRODUCING

CROSS-REFERENCE TO RELATED APPLICATIONS

This application is the United States national phase of International Application No. PCT/DE2018/000222 filed Jul. 21, 2018, and claims priority to German Patent Application No. 10 2017 006 991.3 filed Jul. 26, 2017, the disclosures of which are hereby incorporated by reference in their entirety.

BACKGROUND OF THE INVENTION

Field of the Invention

The invention relates to a method for producing a sealed-edge pouch with a laminate composite stored therein, to a device for producing a sealed-edge pouch as per this method, and to a sealed-edge pouch produced according to this method.

Description of Related Art

DE 39 21 434 A1 discloses sealed-edge pouches. In order to prevent sticking of the substrate to the packaging material during long term storage, studs or rings are impressed in that region of the carrier film which surrounds the substrate.

SUMMARY OF THE INVENTION

The present invention is based on the problem of developing a method and a device for the automated production of sealed-edge pouches and a sealed-edge pouch produced in such a manner.

This problem is solved with the features of the main claim. For this purpose, the laminate composite is detached from a laminate composite web having a carrier film with substrates which are arranged thereon and are covered by means of a respective cover film.

An intermediate body is supplied to the laminate composite web or to the laminate composite or is moulded into the carrier film such that the intermediate body or the intermediate bodies surrounds/surround all of the free surfaces of the substrate at least in regions. The laminate composite and all of the intermediate bodies are introduced between two packaging material webs. The packaging material webs are sealed to each other. Finally, the sealed-edge bags are separated.

In the device, a laminate composite web which has a carrier film and at least adhesive-containing substrates which sit thereon and are each provided with a cover film can be conveyed by means of a first conveyor device. Laminate composites each having at least one substrate can be detached from the laminate composite web by means of a first separating device. Intermediate bodies can be mounted into the carrier film by means of a forming device, or the device has a deflecting device, and therefore the laminate composite web or a laminate composite can be overlapped by means of an intermediate body. The laminate composites including the intermediate body can be introduced between two packaging material webs at a packaging station. The two packaging material webs can be joined to each other outside the projected area of the laminate composite at a sealing station. The joined packaging material webs can be conveyed by means of a second conveyor device. In addition, sealed-edge pouches each filled with a laminate composite can be detached by means of a second separating device.

The sealed-edge pouches comprise at least one substrate, the thickness of which is between three times and seven times the thickness of a carrier film portion of the carrier film. The carrier film portion consists of two carrier film portion sections overlapping in regions. In addition, the sealed-edge pouch is a four-edge sealed pouch.

The exemplary embodiments below describe methods and devices with which sticking of the substrate to the packaging materials, for example due to cold flow, is prevented even in the case of thick, adhesive-containing substrates. The user can therefore easily remove the laminate composite containing the substrate from the sealed-edge pouch immediately before use.

During the production of the sealed-edge pouch, tearing, perforating or other damage to the films which are used and which are part of the laminate composite is prevented. Both reliable, reproducible production and easy removal of the laminate composite having a thick substrate are therefore ensured.

BRIEF DESCRIPTION OF THE DRAWINGS

Further details of the invention emerge from the dependent claims and the descriptions below of schematically illustrated exemplary embodiments.

FIG. 8: shows the preparation of the material to be packaged from FIG. 7,
FIG. 9: shows a partial longitudinal section of the material to be packaged from FIG. 7;
FIG. 10: shows a partial longitudinal section of a packaging unit from FIG. 7.

DETAILED DESCRIPTION OF THE DRAWINGS

Figure 1:
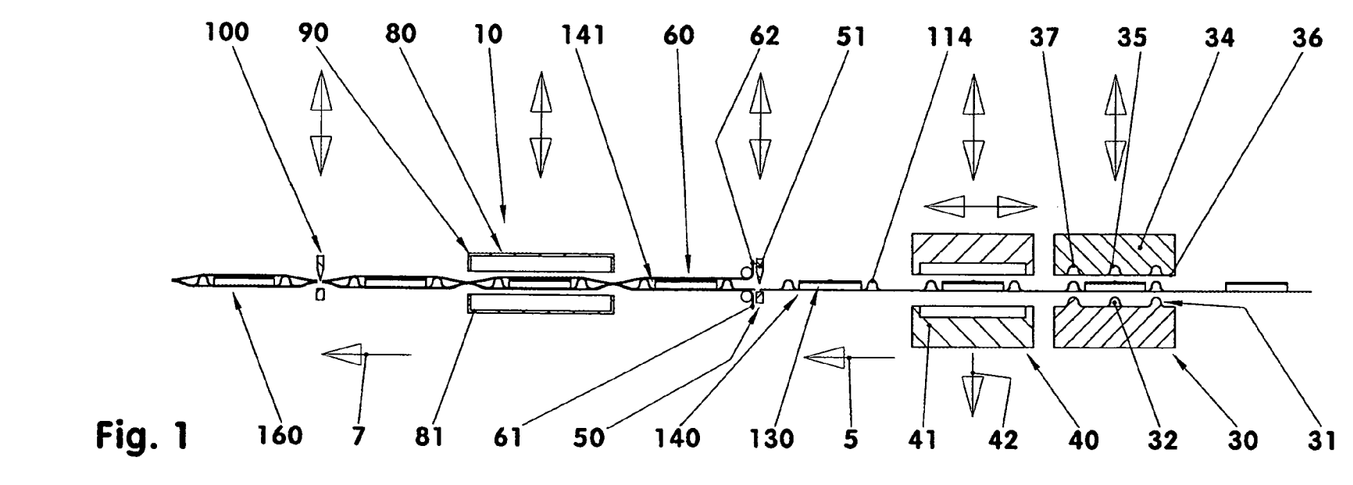
FIG. 1: shows a schematic illustration of a first exemplary embodiment.

FIG. 1 shows a schematic illustration of a device (10) for packaging adhesive-containing substrates (130) in sealed-edge pouches (160). The adhesive-containing substrates (130) sit, for example, centrally in the width direction (6) on a carrier film (110), what is referred to as a release liner. In the width direction (6), the carrier film (110) is wider than the individual substrate (130). The carrier film (110) is transported together with the substrate (130) cyclically in a conveying direction (5) by means of a first conveyor device (40).

The individual adhesive-containing substrate (130) can also contain active substances. For example, it can be designed as a transdermal therapeutic system. In the exemplary embodiment, cf. FIG. 19, the substrate (130) has a cylindrical shape, wherein its end surface (131) forms the base surface sitting on the carrier film (110). Its height, the thickness of the substrate (130), is, for example, between 50 micrometres and 700 micrometres, for example between 300 micrometres and 500 micrometres. The substrate (130) is, for example, formed homogeneously. The substrate (130) has, for example, a specific mass of 400 grams per square metre with respect to the used part of the surface (111) of the carrier film (110).

Figure 4:
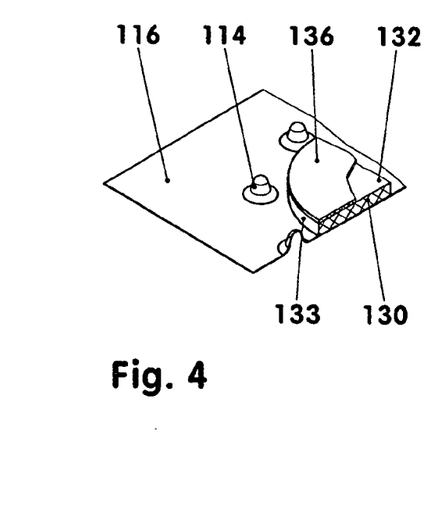
FIG. 4: shows a partial longitudinal section of the material to be packaged from FIG. 1.

The substrate (130) can also have the shape of an ellipsoid, a cuboid, a cube, a prism, etc. For example, in all of the exemplary embodiments, the end surface (131) facing the carrier film (110) and the end side (132) facing away from the carrier film (110), cf. FIG. 4, are formed parallel to each other and congruently with respect to each other.

Figure 2:
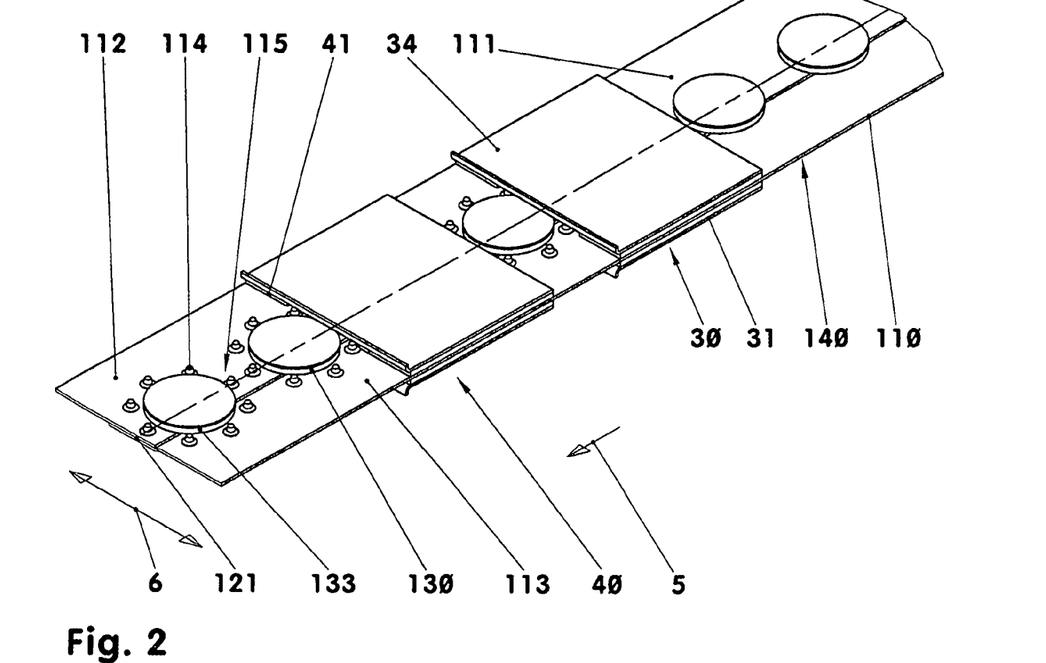
FIG. 2: shows the preparation of the material to be packaged from FIG. 1.

The carrier film (110), cf. FIG. 2, consists, for example, of two carrier film sections (112, 113) overlapping in regions. The overlap (121) is oriented, for example, symmetrically with respect to the vertical centre longitudinal plane of the carrier film (110). The width of the overlap (121) is, for example, between 5% and 30% of the width of the carrier film (110) in the width direction (6). The longitudinal direction of the carrier film (110) is oriented in the conveying direction (5). The carrier film sections (112, 113) have, for example, a thickness of 100 micrometres. In the exemplary embodiment, they are produced from polyethylene terephthalate (PET). They can be configured to be non-adhesive. For example, at least the surface (111) facing the substrate (130) is siliconized.

A cover film (136), what is referred to as a backing layer, is arranged over the full area on that end side (132) of the substrate (130) which faces away from the carrier film (110). For example, the cover film (136) adheres to the substrate (130). Its surface (137) which is projected in a normal projection onto the carrier film (110) corresponds to the area of the end side (132), and therefore the cover film (136) does not protrude over the substrate (130). In the exemplary embodiment, the cover film (136) is composed of the same material as the carrier film (110). The thickness of the cover film (136) is, for example, 23 micrometres.

All of the surfaces of the substrate (130) which are not in contact with the carrier film (110) or the cover film (136) are free surfaces (133). The substrate (130) illustrated in this exemplary embodiment has a free surface (133). This is the lateral surface of a cylinder.

The carrier film (110) with the substrates (130) which are arranged thereon and each bear a cover film (136) forms a laminate composite web (140). When said laminate composite web (140) is conveyed in the conveying direction (5), the carrier film (110) is gripped and displaced by means of transport jaws (41) of the conveyor device (40). After release of the transport jaws (41) in the release direction (42), the carrier film (110) is stationary. The transport jaws (41) are moved back into the starting position. Here, they again grip the carrier film (110). The conveying stroke of the conveyor device (40) corresponds, for example, to the centre distance of two substrates (130) on the carrier film (110). In the case of a device (10) which can be used multiple times, the conveying stroke can also be a multiple of said distance. The stroke height of the transport jaws (41) normally to the carrier film (110) is, for example, greater than the sum of the heights of the substrate (130) and of the cover film (136). The stroke frequency of the conveyor device (40) is, for example, 5500-6000 strokes per hour.

In the illustration of FIGS. 1 and 2, a forming device (30) in the structural form of an embossing device (30) is connected upstream of the conveyor device (40). Said embossing device (30) has a punch assembly (31) with, for example, eight punches (32) and a die (34) which are both movable towards each other and away from each other in a normal direction to the carrier film (110). The die (34) has recesses (35) which are designed identically and are arranged, for example, along a pitch circle.

Said recesses each have, for example, the shape of a cone, the generatrix of which merges, for example, tangentially into the base surface (36) of the die (34). The cone tip (37) is designed in the shape of a spherical portion. The diameter of the cone base lying in the plane of the base surface (36) is, for example, greater than half of the depth of the recess (35). The punch (32) is formed analogously thereto.

When the punch assembly (31) and the die (34) move together, the carrier film (110) is pressed into the recesses (35) of the die (34) by means of the punches (32). The carrier film (110) is plastically deformed locally here, and therefore, upon the return stroke of the embossing device (30), pimples (114) remain in the carrier film (110). The maximum elongation of the carrier film (110) is smaller here than the elongation at break. The height of said pimples (114) which, for example, are of conical design, is higher than the sum of the thicknesses of the substrate (130) and the cover film (136). For example, eight pimples (114) which surround the lateral surface (133) of the substrate (130) are produced during each embossing stroke. The circle of pimples (115) produced in this manner has, for example, a uniform division. The circle of pimples (115) can be designed such that one or more pimples (114) are moulded into the overlapping part of the carrier film sections (112, 113).

Figure 3:
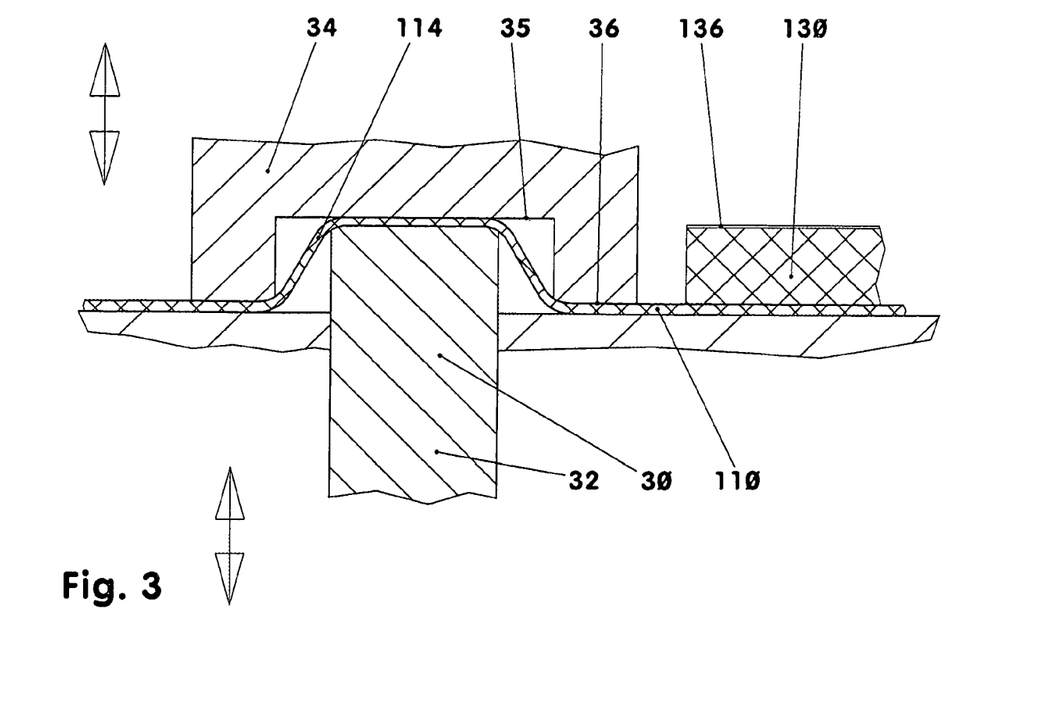
FIG. 3: shows a partial section of a cold forming device.

FIG. 3 shows a partial section of a further forming device (30). The individual recess (35) of the die (34) is formed cylindrically. The diameter of said recess is, for example, 30 times the thickness of the transport film (110). At the transition to the base surface (36), the recess (35) is formed in a rounded manner.

Each individual punch (32) is likewise formed in a cylindrical manner. It has a rounded peripheral edge. Its diameter is, for example, half of the diameter of the recess. This ratio of diameters can be between 0.375 and 0.75. At a lower ratio than the stated minimum value, the carrier film (110) can tend to stretch. If the maximum value mentioned is exceeded, there is the risk of pimples (114) being torn out.

In the embodiments described, cold forming methods are used for the moulding of the pimples (114). Damage to the substrate (130) due to heat effects is avoided in this case. In addition, when cold forming is used, the pimples (114) have only a low spring-back after the return stroke of the forming device (30).

The forming device (30) can be activated while the conveyor device (40) is stationary. However, it is also conceivable to carry out the forming operation during the conveying stroke. In this case, the forming device (30) is movable in the conveying direction (5) and counter to the conveying direction (5). The forming device (30) can be coupled here to the conveyor device (40). It is also conceivable to integrate the forming device (30) in the conveyor device (40). A device of this type has a combined conveying and forming tool. The pimples (114) are formed when the transport jaws (41) are closed. The closing speed of the tool is, for example, adjustable here. Tearing of the carrier film (110) can therefore be prevented. During the conveying, the carrier film (110) with the substrate (130) arranged thereon does not have any regions of different elasticity. The carrier film (110) can therefore be conveyed without slippage.

In the case of a conveyor device (40) downstream of the forming device (30), the transport jaws (41) are designed in such a manner that they engage around the pimples (114). For example, the transport jaws (41) have an inner contour in the shape of a portion of a hollow cylinder. Both the forming device (30) and the conveyor device (40) can be designed to be used multiple times.

The carrier film (110) is transported further to a separating device (50) by means of the conveyor device (40). The separating device (50) comprises a transverse cutting device with a transverse cutting knife (51). The width of the transverse cutting knife (51) in the width direction (6) is greater than the width of the carrier film (110).

Figure 5:
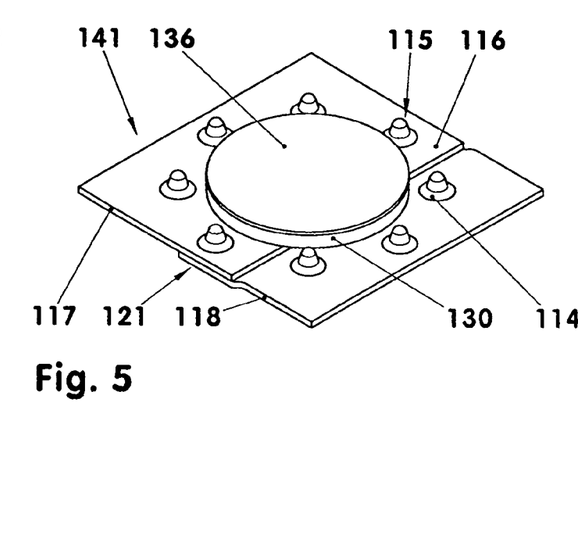
FIG. 5: shows the material to be packaged from FIG. 1.

When the separating device (50) is actuated, the carrier film (110) is completely severed. In the process, individual laminate composites (141) are produced. FIGS. 4 and 5 show a laminate composite (141) of this type in an isometric partial longitudinal section and in an isometric illustration. Said laminate composite comprises a carrier film portion (116), a substrate (130) and a cover film (136). In this exemplary embodiment, the carrier film portion (116) (illustrated at the bottom here) consists of two carrier film portion sections (117, 118) which overlap in regions and have pimples (114) moulded therein. In this exemplary embodiment, the ratio of the overlap (121) to the width of the laminate composite (141) corresponds to the ratio of the width of the overlap (121) to the width of the carrier film (110). The pimples (114) surround the free surface (133) of the substrate (130). The cover film (136) sticks to the substrate (130).

The laminate composite (141) separated in this manner is packaged in the following packaging station (60). A lower packaging material web (61) and an upper packaging material web (62) are supplied to the packaging station (60). The material (141) to be packaged, e.g., the laminate composite (141), is supplied between said two packaging material webs (61, 62). After being supplied, the laminate composite (141) rests together with the carrier film portion (116) on the lower packaging material web (61). The upper packaging material web (62) rests on the cover film (136) and on the pimples (114). Outside the carrier film portion (116), the upper packaging material web (62) rests on the lower packaging material web (61). In the exemplary embodiment, the transport direction (7) of a second conveyor device (90) conveying the packaging material webs (61, 62) is identical to the conveying direction (5) of the first conveyor device (40). The second conveyor device (90) is also a non-continuous conveyor.

In a downstream sealing station (80), the upper packaging material web (62) and the lower packaging material web (61) are sealed to each other. For example, the two packaging material webs (61, 62) are welded to each other at all four edges surrounding the laminate composite (141). The sealing seams (161) produced in this manner therefore surround that surface of the laminate composite (141) which is projected in a normal projection onto the packaging material webs (61, 62). Two sealing seams (161) are in each case located between two embedded laminate composites (141). Said sealing seams (161) can touch each other or can be at a small distance from each other. In the exemplary embodiment, the sealing station (80) is additionally designed as a second conveyor device (90). The conveying of the packaging material webs (61, 62) with the laminate composite (141) embedded therein therefore takes place during the sealing of the packaging material webs (61, 62). The sealing tools (81) serve here as transport jaws. After the conveying stroke, the sealing tools (81) are opened and the sealing device (80) is moved back into the starting position again for conveying.

It is also conceivable to arrange the conveyor device (90) and the sealing station (80) in a manner separated from each other in the material flow. For example, the conveyor device (90) is arranged here downstream of the sealing station (80). The sealing of the packaging material webs (61, 62) can then take place during the conveying or while the second conveyor device (90) is stationary.

The packaging material webs (61, 62) which are sealed to each other and have the embedded laminate composite (141) are conveyed to a second separating device (100). The second separating device (100) is, for example, constructed in the same manner as the first separating device (50). When the second separating device (100) is actuated, the latter severs the two packaging material webs (61, 62) between the two sealing seams (161) lying next to each other. Sealed-edge pouches (160) which each contain a laminate composite (141) are therefore separated. The individual sealed-edge pouch (160) has a lower packaging material (162) and an upper packaging material (163) which are each joined to each other by means of four sealing seams (161).

Figure 6:
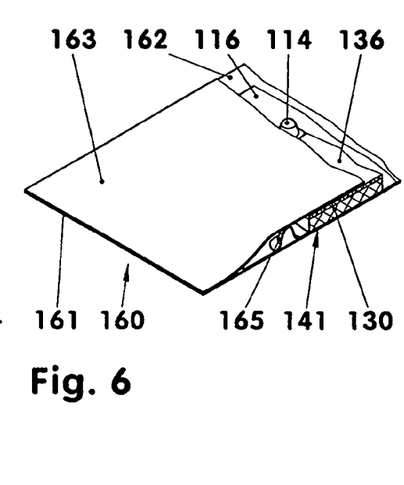
FIG. 6: shows a partial longitudinal section of a packaging unit from FIG. 1.
Figure 7:
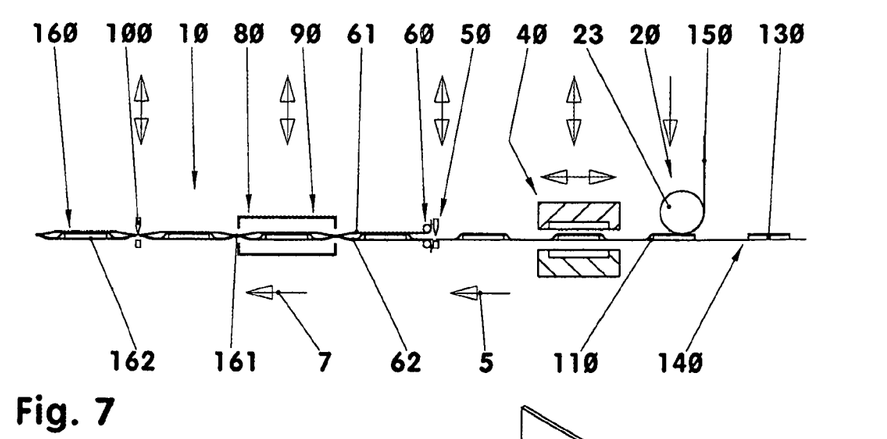
FIG. 7: shows a schematic illustration of a second exemplary embodiment.

FIG. 6 shows a partial longitudinal section of a sealed-edge pouch (160) of this type in an isometric view. The thickness of the substrate (130) is between three times and seven times the carrier film portion (116). The adhesive-containing substrate (130), on the end side (132) of which the cover film (136) is arranged, sticks to the carrier film portion (116). The pimples (114) as intermediate bodies (165) surround the free surface (133) of the substrate (130) here, and therefore contact of one of the packaging material webs (61, 62) with the substrate (130) is prevented.

In order to use the substrate (130), the user tears open the sealed-edge pouch (160) which can have predetermined breaking points for this purpose. The user can then easily remove the laminate composite (141). The substrate (130) does not have any contact with the packaging materials (162, 163). The user can then pull off the carrier film portion sections (117, 118) from the substrate (130) and place the substrate (130) by its end surface (131) onto the skin, for example.

Upon a geometrical deformation of the substrate (130) due to temperature fluctuations, moisture fluctuations or application of pressure, the substrate (130) can be deformed, for example during storage, into the region of the pimples (114). Even in these cases, the size of the pimples (114), their strength and their arrangement prevent contact of the substrate (130) with the packaging materials (162, 163). The laminate composite (141) can therefore be safely removed in all cases.

Figures 8, 9, 10:
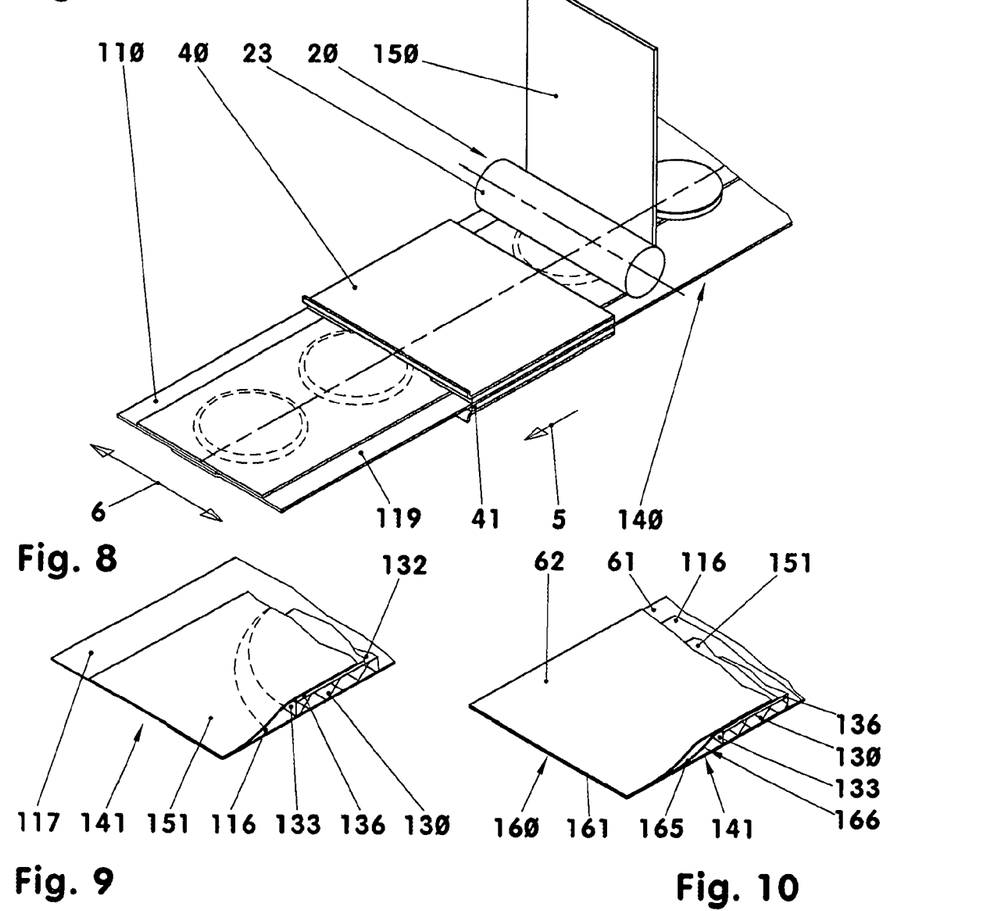

FIGS. 7-10 illustrate a second exemplary embodiment for the packaging of adhesive-containing substrates (130). The carrier film (110), the substrate (130) and the cover film (136) are initially designed and arranged in the manner as described in conjunction with the first exemplary embodiment. A protective film (150) is supplied to the laminate composite web (140) on a deflecting device (20) by means of a deflecting roller (23). Said protective film is produced, for example, from the same material as the carrier film (110). It can be siliconized on the side facing the substrate (130) and can be designed not to be siliconized on the side facing away from the substrate (130). In the exemplary embodiment, the protective film (150) is wider in the width direction (6) than the sum of the diameter of the substrate (130), twice the thickness of the substrate (130) and twice the thickness of the cover film (136). In the illustration of FIGS. 8-10, the protective film (150) is of narrower design in the width direction (6) than the carrier film (110), and therefore the carrier film (110) protrudes on both sides with a transport web (119) over the protective film (150). The transport web (119) has, for example, the same width on both sides, wherein the protective film (150) lies symmetrically with respect to the centre longitudinal direction of the substrates (130). The individual substrate (130) including the associated cover film (136) is therefore concealed on all sides after the protective film (150) has been placed thereon. In FIG. 8, the bulges of the protective film (150) over the laminate composite web (140) are marked as dashed lines.

In this exemplary embodiment, the first conveyor device (40) is designed in the manner as described in conjunction with the first exemplary embodiment. The conveyor device (40) conveys the carrier film (110) to a first separating device (50), which is constructed as described above. Upon actuation of the separating device (50), the carrier film (110) and the protective film (150) resting thereon are severed. The laminate composites (141) which are separated in such a manner are in each case covered by means of a respective protective film portion (151).

FIG. 9 shows this intermediate product after the separation in a vertical partial longitudinal section along the vertical centre longitudinal plane of the carrier film (110). The two carrier film portion sections (117, 118) overlap in a partial region in the width direction (6). The ratio of the width of the overlap (121) to the width of the laminate composite (141) corresponds to the ratio mentioned in conjunction with the first exemplary embodiment. The substrate (130) lies centrally on the carrier film portion (116), and the end side (132) of said substrate is covered by means of the cover film (136). The protective film portion (151) rests on the cover film (136) and on the transport film portion (116).

In the following packaging station (60), said intermediate product is introduced between a lower packaging material web (61) and an upper packaging material web (62). In the process, the two packaging material webs (61, 62) come into contact in the transport direction (7) upstream of the carrier film portion (116) and downstream of the carrier film portion (116) and on both sides in the width direction (6) to the sides of the carrier film portion (116).

A sealing station (80) is also designed as a second conveyor device (90) in this exemplary embodiment. During the conveying, sealing seams (161) are introduced in the zones in which the lower packaging material web (61) and the upper packaging material web (62) are in contact. The sealing station (80) can also be arranged spatially separated from the second conveyor device (90).

The packaging material webs (61, 62) which are sealed to each other and have the laminate composite (141) embedded therein and the protective film portion (151) are conveyed to a second separating device (100). Sealed-edge pouches (160) which are closed on all sides here are detached by means of the second separating device (100).

FIG. 10 illustrates a partial longitudinal section of a sealed-edge pouch (160) of this type. The upper packaging material web (62) and the lower packaging material web (61) are connected to each other in the peripheral sealing seams (161) of the four-edge sealing pouch (160). The transport film portion (116) with the substrate (130), the cover film (136) and the protective film portion (151) are enclosed between the two packaging material webs (61, 62). The protective film portion (151) here forms an intermediate body (165) which lies between the free surface (133) of the substrate (130) and the packaging material webs (61, 62). Its surface (166) facing the substrate (130) has the same adhesive properties as that surface (111) of the carrier film (110) which faces the substrate (130). There is therefore no risk of the substrate (130) adhering to the packaging materials (162, 163) even in the event of changes to the environmental conditions.

The opening of the sealed-edge pouch (160) and the insertion of the substrate (130) take place as described above. After removal of the substrate (130) from the sealed-edge pouch (160), the protective film portion (151) can be removed here, for example, easily and without a residue.

Figures 11, 12:
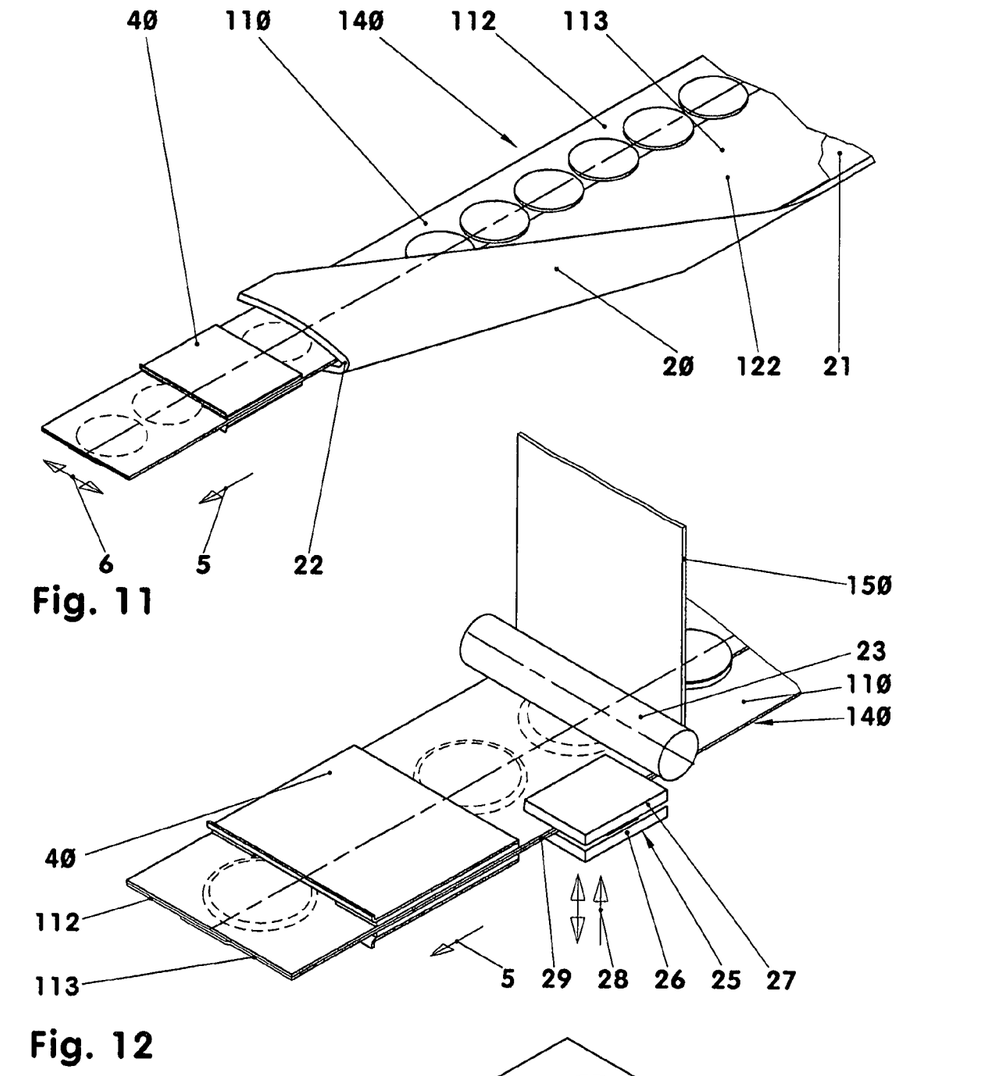
FIG. 11: shows the preparation of the material to be packaged according to a third exemplary embodiment.
FIG. 12: shows the preparation of the material to be packaged according to a fourth exemplary embodiment.

FIG. 11 shows a further exemplary embodiment for preparing the substrates (130) to be packaged. The carrier film (110) has, for example, twice the width of the carrier films (110) described above. In this case, the carrier film section (112) which is illustrated on the left in the illustration of FIG. 11 has, for example, the same dimensions as the carrier film sections (112) described in the exemplary embodiments described above.

In this exemplary embodiment, the carrier film section (113) illustrated on the right in this FIG. 11 is three times the width of the left carrier film section (112). The overlap (121) of the two carrier film sections (112, 113) is designed as described in conjunction with the other exemplary embodiments. The substrate (130) which is provided with the cover film (136) sits on the overlap (121).

A deflecting device (20) in the structural form of a diverting device (20) is arranged upstream of the first conveyor device (40) in the material flow direction (5) oriented in the conveying direction (5). Said diverting device (20) has a guide surface (21) on which the carrier form (110) rests. Said guide surface (21) has an arc portion (22) which encloses, for example, an angle of 15 degrees with the conveying direction (5). The arc portion (22) extends over an angle of 180 degrees. The carrier film (110) sliding along the guide surface (21) during the conveying is therefore deflected in regions, and therefore the outer region (122) of the carrier film (110) is deposited on the cover film (136). The substrate (130) is therefore driven in, as it were, by means of the carrier film (110).

The now, for example, double-layered carrier film (110) is transported cyclically in the conveying direction (5) by means of the first conveyor device (40). The conveyor device (40) is constructed here, for example, in the manner as described in conjunction with the first and second exemplary embodiment.

A first separating device (50) is used to separate laminate composites (141) which are then transferred to a packaging station (60). The width of the laminate composite (141) and the ratio of the overlap (121) to said width correspond to the previous exemplary embodiments. The material to be packaged is guided at the packaging station (60) between two packaging material webs (61, 62) which are subsequently, for example, welded to each other. Sealed-edge pouches (160) are then separated. The separating devices (50, 100), the packaging station (60) and the sealing station (80) are constructed, for example, in the manner as described in conjunction with the previous exemplary embodiments.

In the sealed-edge pouch (160), that part of the carrier film portion (116) which lies over the substrate (130) and the cover film (136) forms an intermediate body (165) which surrounds the free surface (133) of the substrate (130). It prevents contact between the packaging material (61, 62) and the substrate (130).

When the substrate (130) is removed from the sealed-edge pouch (160), said substrate initially continues to be surrounded by the carrier film portion (116). Consequently, the carrier film portion (116) cannot unintentionally fall out. With the pulling apart of the carrier film portion sections (117, 118) in the region of the overlap (121), the substrate (130) can be exposed and used, for example stuck onto the skin.

Figure 13:
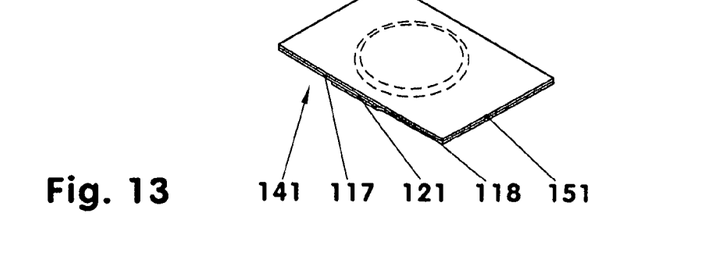
FIG. 13: shows material to be packaged according to the exemplary embodiment from FIG. 12.

FIGS. 12 and 13 illustrate a further variant. The two-part carrier film (110) with the substrates (130) which sit thereon and are each provided with a cover film (136) is initially designed in the manner as described in conjunction with the first and second exemplary embodiment.

Before passage through the first conveyor device (40), a protective film (150) is supplied. This takes place as described in conjunction with the second exemplary embodiment. In the exemplary embodiment of FIGS. 12 and 13, the width of the protective film (150) in the width direction (6) corresponds to the width of the carrier film (110) in the same direction.

A joining device (25) is arranged on one side between the deflecting roller (23) and the conveyor device (40). Said joining device has an upper die (27) and a lower die (26) which are movable normally to each other in an advancing direction (28) and in the opposite direction. In the closed position of the joining tools (26, 27), the carrier film (110) and the protective film (150) are joined to each other, for example they are welded to each other. The joining methods used in this connection can be, for example, ultrasonic welding, rotational friction welding, heating element welding, laser welding, etc. Folding or embossing of the films against one another or adhesive bonding by means of a silicone adhesive are also conceivable. That length of the joining seam (29) which is oriented in the conveying direction (5) corresponds, for example, to the division of the substrates (130) on the carrier film (110). The joining can take place while the conveyor device (40) is stationary or during the conveying. In the last-mentioned case, the joining device (25) is movable in the conveying direction (5) and counter to the conveying direction (5).

The separation of the laminate composites (141) takes place as described in conjunction with the previous exemplary embodiments. The laminate composite (141) produced in this manner is illustrated in FIG. 13. The substrate (130), the edges of which are indicated here as a hidden line by dashed lines, is arranged completed concealed between the carrier film (110) and the protective film (150).

The packaging of the laminate composites (141) takes place as described in conjunction with the second exemplary embodiment. In the sealed-edge pouch (160), the protective film (150) forms the intermediate body (165) which prevents the substrate (130) from adhering to the packaging material webs (61, 62). When the substrate (130) is removed from the sealed-edge pouches (160), the carrier film portion (116) and the protective film portion (151) fastened thereto are also removed. Said film portions (116, 151) do not adhere to the packaging materials (162 163), and therefore easy removal is ensured. Before the substrate (130) is used, the transport film portion (116) and the protective film portion (151) are pulled off. The substrate (130) can be subsequently used.

This method can also be used in the event of use over multiple times. In this case, for example, a plurality of laminate composites (130) parallel to one another are produced and packaged in sealed-edge pouches (160).

Figures 14, 15, 16:
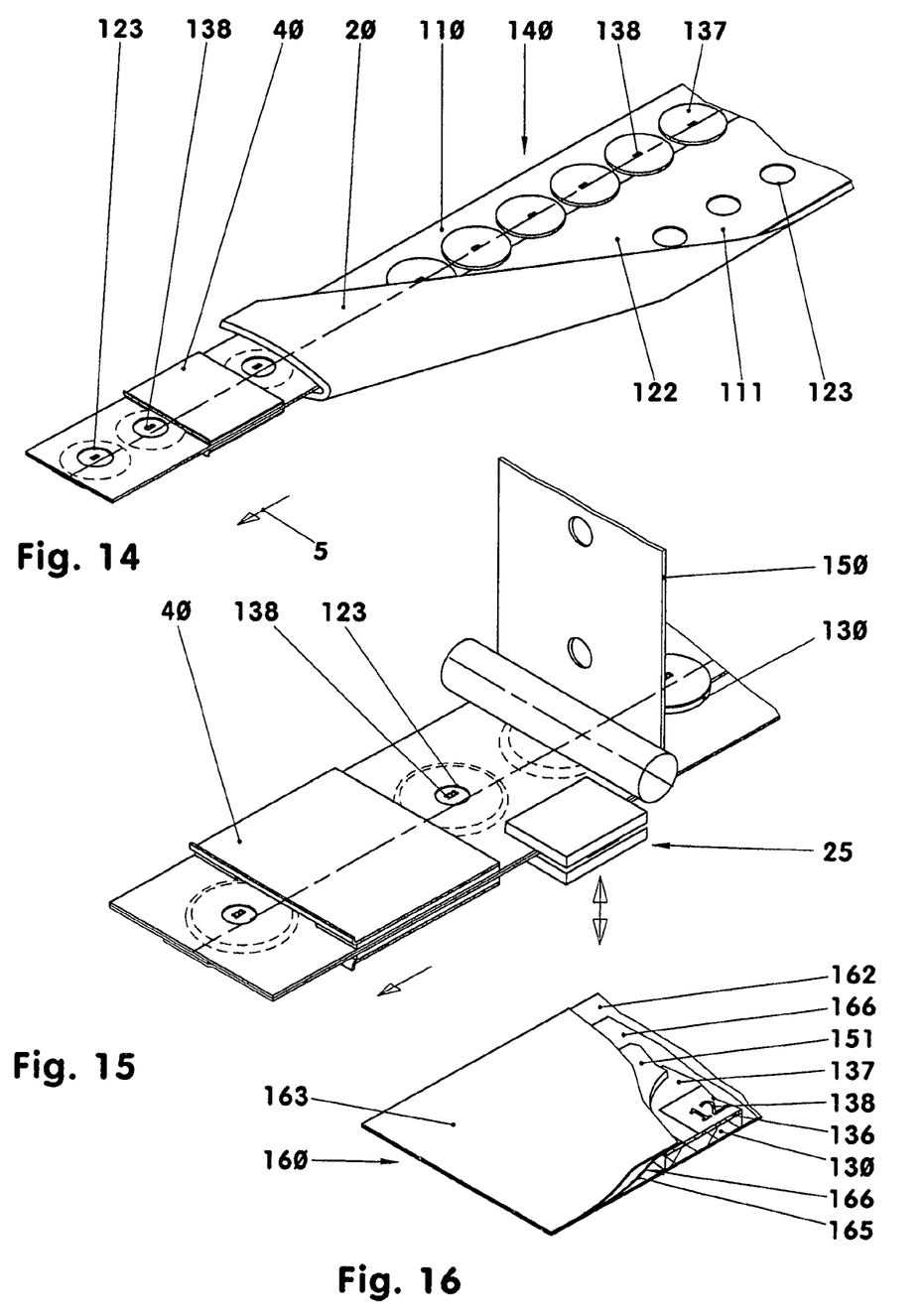
FIG. 14: shows a variant of the exemplary embodiment from FIG. 11.
FIG. 15: shows a variant of the exemplary embodiment from FIG. 12.
FIG. 16: shows a partial longitudinal section of a packaging unit according to FIGS. 14 and 15.

FIG. 14 shows a variant of the exemplary embodiment illustrated in FIG. 11. The cover film (136) bears a label (138) which, for example, identifies the batch of the substrate (130). An individual identification marking of each substrate (130) is also conceivable. This label (138) is applied to the carrier film (110), for example, in the method sequence after application of the substrates (130) provided with the cover film (136).

The outer region (122) of the carrier film (110) has openings (123), the division of which corresponds to the division of the substrates (130) on the carrier film (110). The openings lie on a parallel to the vertical centre longitudinal plane of the substrates (130). A respective opening (123) is arranged next to a substrate (130) in the width direction (6). The diameter of an opening (123) is smaller than the diameter of the cover film (136).

In the deflecting device (20), the outer region (122) of the carrier film (110) is deflected in such a manner than an opening (123) lies in each case on a cover film (136). The label (138) is therefore visible and readable through the outer region (122) of the carrier film (110), said outer region lying above the substrate (130).

The separating of the laminate composites (141) and the packaging take place as described in conjunction with the exemplary embodiment of FIG. 11. In the sealed-edge pouch (160), the outer region (122) in this exemplary embodiment also forms an intermediate body (165) which prevents sticking of the free surfaces (133) of the substrate (130) to the packaging materials (162, 163).

During the removal from the sealed-edge pouch (160), the user removes the carrier film portion (116) with the substrate (130) wrapped therein. Even before the substrate (130) is exposed, the user can read the label (138) of the cover film (136), for example the production date or use by date, through the opening (123). The release of the substrate (130) from the carrier film (110) takes place as described above.

It is also conceivable in this method to apply the identification marking (138) immediately before packaging. In this case, the label (138) is undertaken through the opening (123) onto the cover film (136) by means of a thermal printer, for example.

FIGS. 15 and 16 show a variant of the exemplary embodiment illustrated in FIGS. 12 and 13. In these illustrations, the openings (123) are arranged in the protective film (150) which is placed at the deflecting roller (23) onto the substrates (130) which are each provided with a cover film (136). Also in this exemplary embodiment, the cover film (136) bears a label (138) or an identification marking (138).

The connection of the protective film (150) to the carrier film (110), the separating of the laminate composites (141), the packaging, the sealing and the detaching of the sealed-edge pouches (160) take place as described in conjunction with the exemplary embodiment of FIGS. 12 and 13.

FIG. 16 shows a partial longitudinal section of the sealed-edge pouch (160) produced by means of this method. The protective film (150) lies between the free surface (133) of the substrate (130) and the packaging materials (162, 163), and therefore sticking of the substrate (130) to the sealed-edge pouch (160) is prevented. In the case of a transparent packaging material (162, 163) the label (138) of the cover film (136) is readable through the packaging material (162, 163). This can be used, for example, during automated sorting.

After the opening, for example tearing open, of the sealed-edge pouch (160), the user removes the substrate (130) which is additionally packaged by means of the carrier film portion (116) and the protective film portion (151). The identification (138) can be checked even before the substrate (130) is unpacked. Additional identification markings, such as, for example, the opening time, the time of use, etc., can also be attached.

Figure 17:
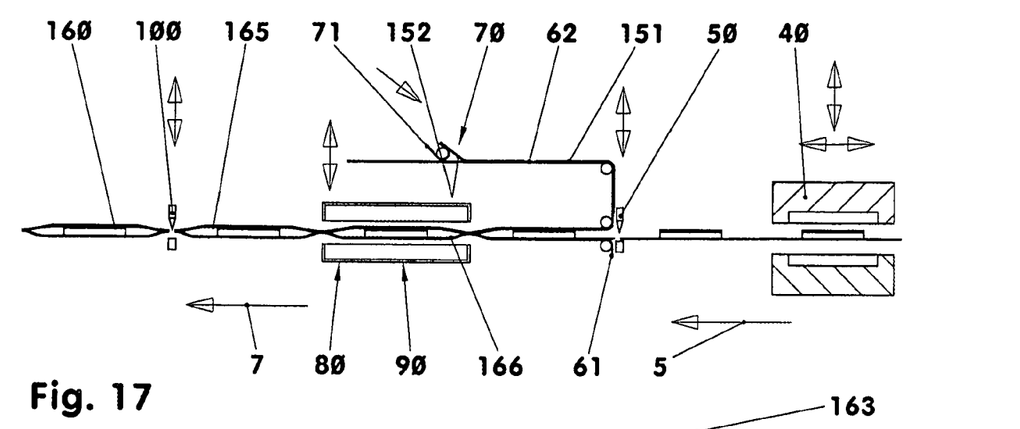
FIG. 17: shows a schematic illustration of a fifth exemplary embodiment.
Figures 18, 19:
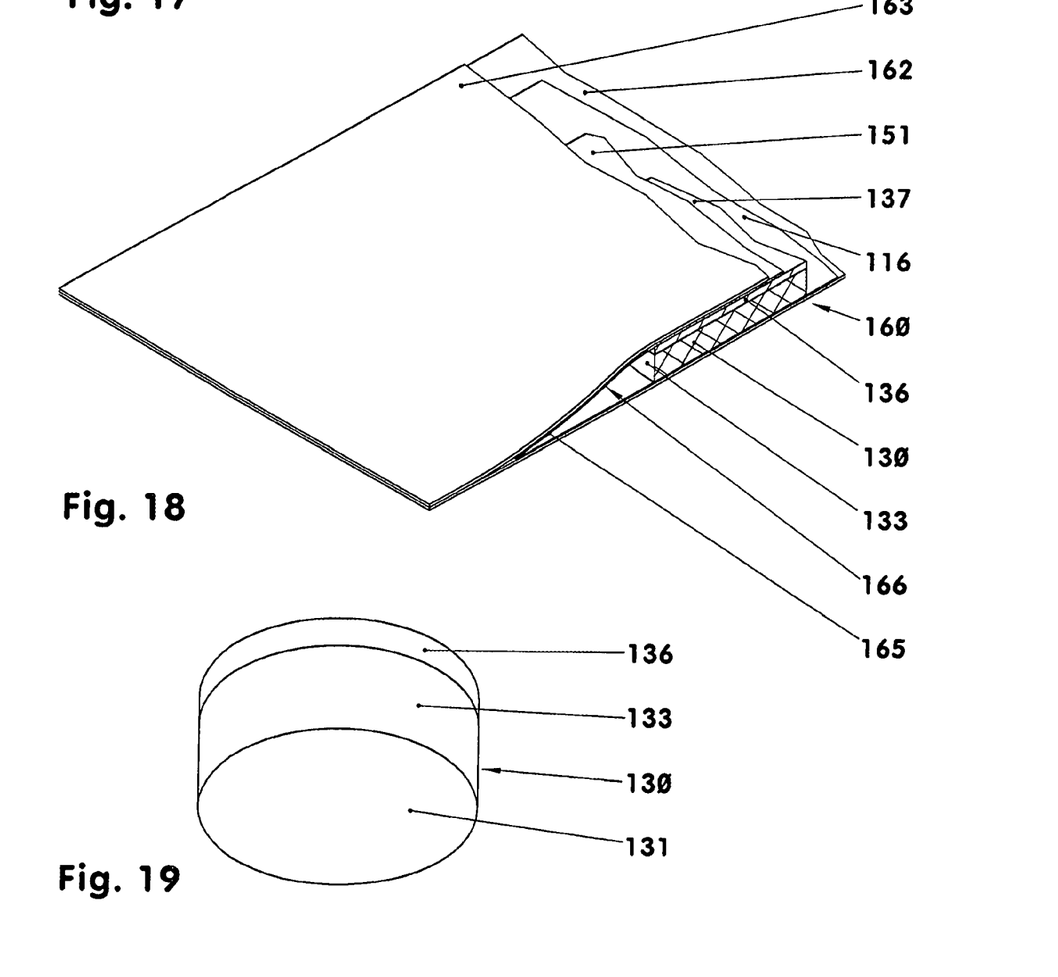
FIG. 18: shows a partial longitudinal section of a packaging unit according to FIG. 17.
FIG. 19: shows a transdermal therapeutic system.

FIGS. 17 and 18 show a further exemplary embodiment. The substrate (130) sits, for example, centrally on the carrier film (110), as described in conjunction with the exemplary embodiments illustrated in FIGS. 1-10. By means of a first conveyor device (40), the carrier film (110) with the substrate (130) which adheres thereto and is provided with a cover film (136) is transported in the conveying direction (5) to a separating device (50). At the latter, the laminate composites (141) are separated. A laminate composite (141) comprises a transport film portion (116), the substrate (130) sticking thereto and the cover film (136) sticking to the substrate (130).

In this exemplary embodiment too, for the packaging use is made of a lower packaging material web (61) and an upper packaging material web (62). In the illustration of FIG. 17, a supply station (70) is arranged above the upper packaging material web (62). At said supply station (70), a protective film portion (151) is fed from a carrier web (71) onto the upper packaging material web (62). The individual protective film portion (151) is designed, for example, in such a manner that its surface (152) facing the upper packaging material web (62) adheres to the upper packaging material web (62). The surface facing away from the upper packaging material web (62) is designed to be non-adhesive at least in relation to the adhesive-containing substrate (130). The length of the individual protective film portion (151) corresponds, for example, to the length of a carrier film portion (116).

The upper packaging material web (62) with the protective film portion (151) adhering thereto and the lower packaging material web (61) are placed around the laminate composite (141) at the packaging station (60). The laminate composite (141) then lies on the lower packaging material web (61). The protective film portion (151) overlaps the carrier film portion (116) with the substrate (130). The upper packaging material web (62) and the lower packaging material web (61) lie against each other in the edge regions and in the second conveying direction (7) upstream and downstream of the carrier film portion (116).

A conveying and sealing station (80, 90) is arranged downstream of the packaging station (60) in the transport direction (7). Said conveying and sealing station is constructed in the manner as described in conjunction with the first two exemplary embodiments. The individual closed sealed-edge pouches (160) are detached by means of a second separating device (100).

FIG. 18 illustrates a sealed-edge pouch (160) of this type in an isometric partial longitudinal section. The laminate composite (141) rests on the lower packaging material web (61). The upper packaging material web (62) with the protective film portion (151) adhering thereto lies on the laminate composite (141). In this exemplary embodiment, said protective film portion (151) forms the intermediate body (165) which prevents contact between the free surface (133) of the substrate (130) and the packaging materials (162, 163).

After the sealed-edge pouch (160) has been torn open, the laminate composite (141) is removed. The protective film portion (151) remains in the sealed-edge pouch (160). After the carrier film portion (116) is pulled off, the substrate (130) can be stuck, for example, onto the skin.

Combinations of the exemplary embodiments mentioned are also conceivable.

LIST OF DESIGNATIONS

5 Conveying direction, first conveying direction, material flow direction
6 Width direction
7 Transport direction, second conveying direction
10 Device for packaging
20 Diverting device, deflecting device
21 Guide surface
22 Arc portion
23 Deflecting roller
25 Joining device
26 Lower die
27 Upper die
28 Advancing direction
29 Joining seam
30 Forming device, embossing device
31 Punch assembly
32 Punch
34 Die
35 Recesses
36 Base surface
37 Cone tip
40 Conveying device, first conveying device
41 Transport jaws
42 Release direction
50 Separating device, first separating device
51 Transverse cutting knife
60 Packaging station
61 Lower packaging material web
62 Upper packaging material web
70 Supply station
71 Carrier web
80 Sealing station
81 Sealing tools
90 Second conveyor device
100 Separating device, second separating device
110 Carrier film, release liner, transport film
111 Surface of (110)
112 Carrier film section
113 Carrier film section
114 Pimples
115 Circle of pimples
116 Carrier film portion, transport film portion
117 Carrier film portion section
118 Carrier film portion section
119 Transport web
121 Overlap
122 Outer region of (110)
123 Openings
130 Substrate
131 End surface
132 End side
133 Free surface of (130), lateral surface of (130)
136 Cover film, backing layer
137 Surface of (136)
138 Label, identification marking
140 Laminate composite web
141 Laminate composite, material to be packaged
150 Protective film
151 Protective film portion
152 Surface of (151)

160 Sealed-edge pouch, four-edge sealed pouch
161 Sealing seam
162 Lower packaging material
163 Upper packaging material
165 Intermediate body
166 Surface of (165)

The invention claimed is:

1. A method for producing a sealed-edge pouch with a laminate composite stored therein, the method comprising the following steps in sequential order:
   supplying a laminate composite web, the laminate composite web comprising a carrier film with adhesive-containing substrates arranged on the carrier film, wherein each of the adhesive-containing substrates is covered by a cover film,
   supplying an intermediate body to the laminate composite web or moulding the intermediate body into the carrier film of the laminate composite web such that the intermediate body surrounds free surfaces of the adhesive-containing substrates at least in regions,
   detaching the laminate composite from the laminate composite web,
   introducing the laminate composite and the intermediate body between two packaging material webs,
   sealing the packaging material webs to each other, and
   separating sealed-edge pouches therefrom.

2. The method according to claim 1, wherein sealing the packaging material webs to each other takes place during conveying the laminate composite by a second conveyor device.

3. The method according to claim 1, wherein a surface of the intermediate body that faces each of the adhesive-containing substrates has the same adhesive properties as a surface of the carrier film which faces each of the adhesive-containing substrates.

4. The method according to claim 1, wherein the cover film is labelled.

5. The method according to claim 1, wherein the carrier film comprises two carrier film sections overlapping in regions to form an overlap, and wherein each of the adhesive-containing substrates sits on the overlap.

6. The method according to claim 1, wherein the intermediate body supplied to the laminate composite web is a protective film.

* * * * *

UNITED STATES PATENT AND TRADEMARK OFFICE
CERTIFICATE OF CORRECTION

| | |
|---|---|
| PATENT NO. | : 11,801,986 B2 |
| APPLICATION NO. | : 16/633995 |
| DATED | : October 31, 2023 |
| INVENTOR(S) | : Klaus Schumann et al. |

It is certified that error appears in the above-identified patent and that said Letters Patent is hereby corrected as shown below:

On the Title Page

Column 1, Item (54) Title, Line 1, delete "PRODUCING" and insert -- PRODUCING SEALED-EDGE POUCHES --

In the Specification

Column 1, Line 1, delete "PRODUCING" and insert -- PRODUCING SEALED-EDGE POUCHES --

Signed and Sealed this
Ninth Day of January, 2024

Katherine Kelly Vidal
*Director of the United States Patent and Trademark Office*